United States Patent [19]

Colton et al.

[11] 3,903,371

[45] Sept. 2, 1975

[54] COMMON CONTROL FRAMING DETECTOR

[75] Inventors: John Robert Colton, Freehold; Robert Bruce Heick, Eatontown; Henry Mann, Holmdel, all of N.J.

[73] Assignee: Bell Telephone Laboratories, Incorporated, Murray Hill, N.J.

[22] Filed: July 1, 1974

[21] Appl. No.: 484,414

[52] U.S. Cl. ........................ 179/15 BS; 178/69.5 R

[51] Int. Cl.[2] ............................................ H04J 3/06

[58] Field of Search ............ 179/15 BS; 178/69.5 R

[56] References Cited

UNITED STATES PATENTS

| | | | |
|---|---|---|---|
| 3,557,314 | 1/1971 | Avignon | 179/15 BS |
| 3,770,897 | 11/1973 | Haussmann | 171/15 BS |
| 3,789,303 | 1/1974 | Hoffman | 178/69.5 R |

*Primary Examiner*—Ralph D. Blakeslee
*Attorney, Agent, or Firm*—John K. Mullarney

[57] ABSTRACT

The PCM encoded digital data groups transmitted to a switching office are respectively stored a frame at a time and then read out from store in a sequence such that a plurality of digital groups are multiplexed on to a common bus. A common control framing detector continually monitors, at the multiplex point, all of the digital groups on a time multiplexed basis. The framing pattern status of each group is stored in a shared recirculating memory, which is continually updated in accordance with changes introduced into each group signal by the switching office for synchronization and reframing purposes. The stored framing pattern status of each digital group is compared with the group framing bits as each group appears on the multiplexed bus. If the comparison fails, an error signal is generated. An error timing store counts the error signal for each group and when the error count of a given group reaches a predetermined threshold an out-of-frame signal is generated which initiates a reframe operation for the out-of-frame group.

12 Claims, 12 Drawing Figures

FRAMING PATTERN CHECKER

MEMORY CELL

IN-FRAME STATUS STORE

ERROR TIMING STORE

COMMON CONTROL FRAMING DETECTOR

BACKGROUND OF THE INVENTION

This invention relates to a framing detector for continually monitoring and determining the in-frame or out-of-frame status of each of a plurality of time division multiplexed digital data groups.

It is a commonplace in digital transmission to incorporate a marker pulse (i.e., framing bit) in a preassigned position in a digital data bit stream for the purpose of maintaining the receiving apparatus in a synchronous relationship to the transmitting apparatus. Such synchronization is essential for correct reconstitution of a message and, in the case of a time division multiplex system, for correct distribution of the several messages to their intended subscribers. To this end, a digital transmission system invariably includes frame detection circuitry for monitoring and determining the in-frame or out-of-frame condition of a received digital data bit stream. And when the digital bit stream goes out-of-frame (i.e., loss of synchronization) vis-a-vis a locally generated framing pattern, the frame detection circuit initiates a reframe operation to recapture frame synchronization. This is standard operating procedure in the digital transmission field.

In the past, pulse code modulation (PCM) digital data terminals have performed the task of framing detection, as well as reframing, signaling extraction, etc., on a per "digroup" basis — a digroup or digital group comprising a plurality of time division multiplexed PCM messages and multiplexed framing and signaling bits; see the article "The D3 Channel Bank" by W. B. Gaunt and J. B. Evans, Jr., *Bell Laboratories Record*, August 1972, pages 229–233, and the references cited therein. The per digroup partitioning of these functions has heretofore resulted in efficient terminal design.

With increasing digital traffic, it is not uncommon now to find proposals for multiplexing a plurality of digroups for transmission to a remote location over a common transmission facility or alternatively for multiplexing a plurality of received digroups on to a common bus at a switching center. These two cases are somewhat analogous and present the same problem with regard to framing detection. Conventional practice would suggest carrying out the frame detection function on a per digroup basis using plural frame detectors to respectively monitor the plurality of multiplexed digroups. The obvious disadvantage of this approach is, of course, its complexity and costly redundancy in detection circuitry.

The U.S. Pat. No. 3,770,897 to R. H. Haussmann et al, issued Nov. 6, 1973, suggests carrying out the frame detection and resynchronization operations for a plurality of multiplexed digital groups on a time-shared basis, but this proposal is really a hybrid of the per digroup approach noted above. The system of the patent functions as a sequential machine that monitors the multiplexed groups in a mutually exclusive fashion. That is, each digital group is separately monitored over a number of frames to determine the in-frame or out-of-frame status of the same. But while a given group is being so monitored, the other digital groups are ignored.

Accordingly, the primary object of the present invention is to continually monitor and determine the in-frame or out-of-frame status of each of a plurality of time division multiplexed digital data groups, treating each independently.

A related object of the invention is to provide a common control framing detector that continually monitors, in the same time frame, each and all of a plurality of time division multiplexed digital groups.

SUMMARY OF THE INVENTION

The framing detector of the invention can be advantageously utilized, by way of example, in a large scale, time division switching machine such as the Bell System's No. 4 ESS. The plurality of PCM encoded digital data groups transmitted to a No. 4 ESS office are respectively stored a frame at a time and then read out from store in a sequence such that a plurality (5) of $n$-channel ($n = 24$) digital groups are multiplexed on to a common bus.

The common control framing detector of the invention continually monitors, at the multiplex point, all of the digroups (and test time slots) on a time multiplexed basis. The framing pattern status of each digroup is stored in a shared recirculating memory, which is continually updated in accordance with changes introduced into each digroup signal by the switching machine for synchronization and reframe purposes. The stored, framing pattern status of each digroup is compared with the digroup framing bits as each digroup appears on the multiplexed bus. If this comparison fails, an error signal is generated. A shared error timing store linearly counts the error signals for each digroup and when the error count of a given digroup reaches a predetermined threshold an out-of-frame signal is generated and sent to a reframer to initiate a reframe operation for the out-of-frame digroup. A frame status store maintains a real-time record of the in-frame and out-of-frame status for each digroup.

An advantageous feature of the invention is the facility with which maintenance testing can be carried out. By the use of test time slots, the common control circuitry that is shared by all digroups can be continually tested, while in service, and failures can thus be quickly detected.

It is a further feature of the invention that the common control approach leads to a substantial savings in circuit complexity, and the circuitry is more easily adapted to integrated circuit design.

BRIEF DESCRIPTION OF THE DRAWINGS

The invention will be more fully appreciated from the following detailed description when the same is considered in connection with the accompanying drawings in which.

DETAILED DESCRIPTION

Figures 1, 3:
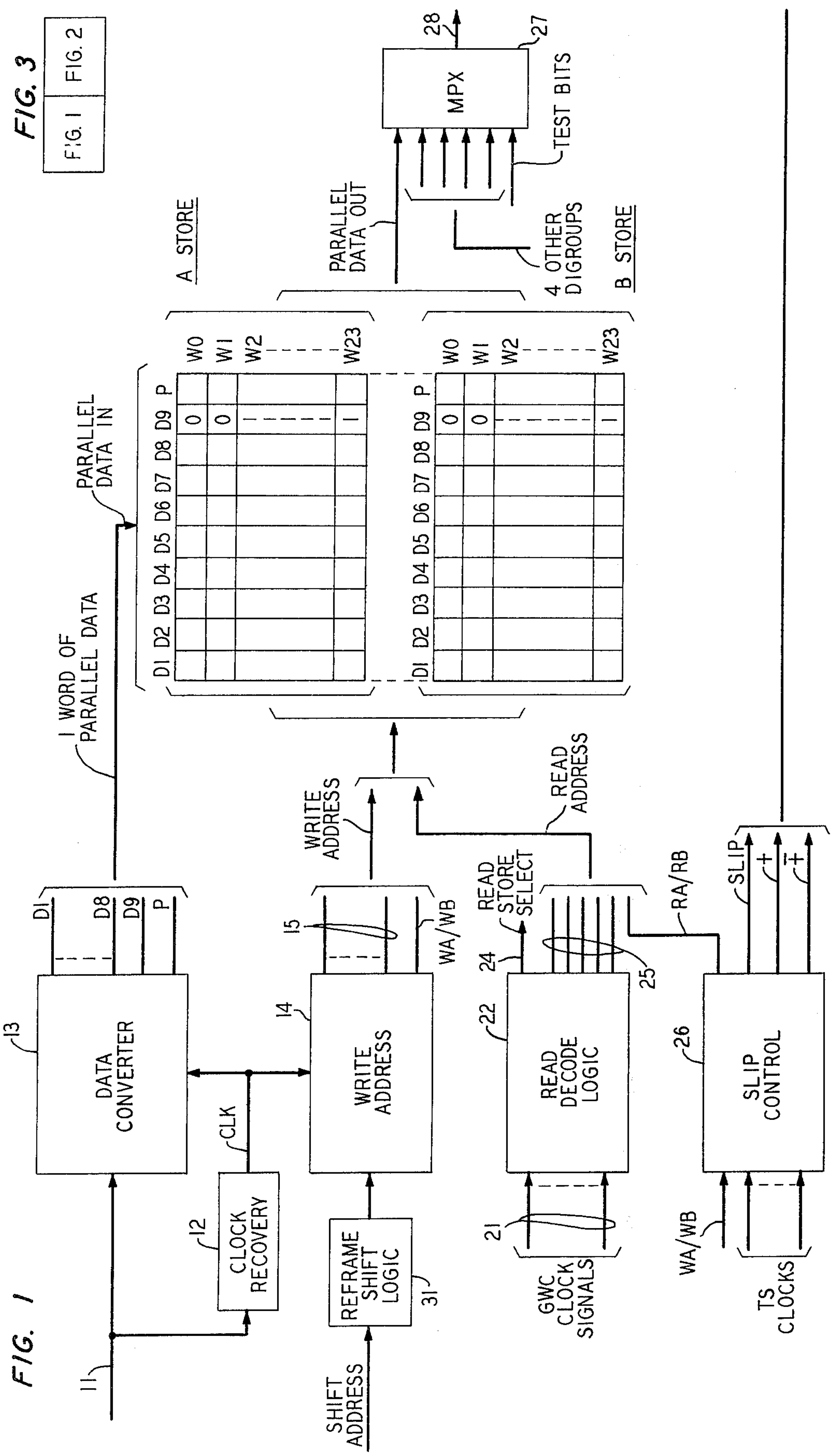
FIGS. 1 and 2, when arranged as shown in FIG. 3, show a simplified schematic block diagram of a portion of a time division switching machine incorporating the apparatus of the present invention.
Figure 2:
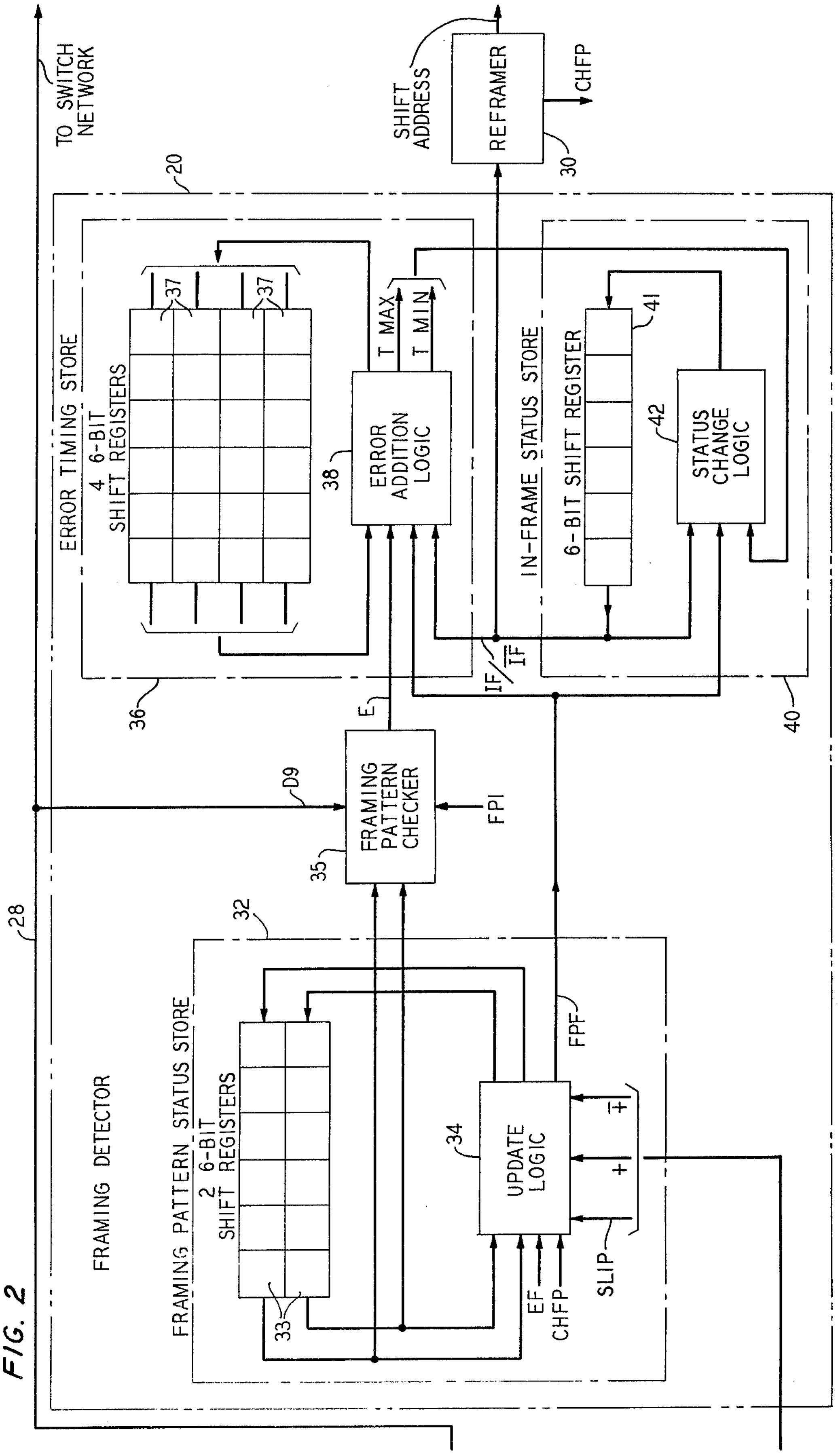

Turning now to FIGS. 1 and 2 of the drawings, there is shown part of a time division switching system that incorporates frame detection circuitry in accordance with the invention. For purposes of illustration, the system of FIGS. 1 and 2 embodies many of the features and aspects of the No. 4 ESS; see the article "No. 4 ESS — Long Distance Switching for the Future" by G. D. Johnson, *Bell Laboratories Record*, September 1973, pages 226–232. It is to be understood, however, that the switching system itself constitutes no part of the present invention and it will be obvious to those in the art that the inventive concepts here disclosed can be used with other and different time division switching systems. And, as heretofore suggested, the present invention can also find use in the analogous situation wherein a plurality of digroups are multiplexed together for transmission to a remote location over a common transmission facility. The incoming transmission line 11 carries a digital group (digroup) of separate and distinct messages in a typical time division multiplexed fashion. Again for purposes of illustration, the data transmitted over line 11 can be assumed to have a format similar to the data format transmitted to a No. 4 ESS office over a T1 transmission line (see, for example, the article "The D3 Channel Bank" by W. B. Gaunt et al, *Bell Laboratories Record*, August 1972, pp. 229–233). This data format is shown in an abbreviated form, in the expanded view of digroup 2, in FIG. 4 (top) of the drawings. The format consists of 24 eight-bit words and one framing bit for a total of 193 bits per frame. The 24 words typically represent 24 separate and distinct messages deposited in 24 separate and distinct channels 0–23. The words are PCM (pulse code modulation) encoded and the least significant bit (i.e., eighth bit) of a channel is periodically dedicated for signaling purposes. This dedication is discussed in detail in the article by Gaunt et al, supra, but it is of no consequence in the consideration of the present invention. The PCM encoded data words can represent encoded voice or video information, digital data from a data set, etc. For present purposes it is convenient to consider the 193rd bit (i.e., the framing bit) as a part of the last word (W23) of a frame. As suggested in FIG. 4, and as will be described in detail hereinafter, five digroups of 24 channels each are multiplexed on to a 128 time-slot bus. Of these 128 time-slots or channels, 120 time-slots are utilized for traffic ($5 \times 24 = 120$) and eight are spares that may be used for maintenance testing and the like.

The received digroup is delivered to the clock recovery circuit 12 and to the data converter 13. The circuit 12 recovers the line timing of the incoming T1 line 11 and serves to generate coincident clock pulses at the incoming line rate (1.544 MHz). These clock pulses are delivered to the data converter 13 and to the write address circuitry 14. The data converter 13 serves to regenerate the received digital bits, degraded in transmission, and it further converts the same from a bipolar to a unipolar format. The data converter 13 also serves to convert each of the successive digital words (W0 – W23) to a parallel bit format. All of the data words except the last (W23) are eight-bit words and hence the D9 bit, on the similarly designated output lead of converter 13, is normally a logical or binary 0. The 193rd or framing bit (D9 bit) is considered part of the last word (W23) and hence with the occurrence of word W23 this D9 bit may be a binary 1 or 0 in accordance with the framing pattern. The D9 bit is written into the store along with the data bits D1 – D8 of data word W23.

The data converter 13 also includes a conventional parity generator (not shown) which counts the number of binary 1 bits, for example, in a data word and adds a parity bit P, where appropriate, for "odd" parity check purposes. The parity check itself is carried out at a later stage in the switching operation and therefore can be disregarded for present purposes.

The output clock pulses of clock recovery 12 are serially delivered to the write address circuit 14 which comprises digit and word counters (not shown). The word counter of circuit 14 counts through 24 words and then recycles. Assuming an in-frame situation, this word counter will count from 0 through 23 in time coincidence with the appearance of data words W0 through W23 at the output of the data converter 13. Thus, the word counter indicates the "address" (e.g., the position in the frame) of each data word. In accordance with binary notation, at least five binary digits are required to indicate a count of 24. It is these five bits on the output leads 15 that are used to write the data words in the appropriate position in the data stores.

The data stores A and B are each organized as a 24 word by 10 bits per word random access memory. When the digroup is in frame, the A and B receive data stores each store a complete frame of data including the framing bit, plus a parity bit for each channel of the frame. As symbolically shown in FIG. 1, the data words W0 – W23 are stored in successive rows of each store along with a D9 bit (which is a binary 0 for all but the last word) and a parity bit (P). Successive frames of incoming data are alternately written into the A and B stores.

Each receive data store comprises a static MOS (metal oxide semiconductor) store with random access memory and conventional address decoding logic. In practice, the A and B storage matrices would simply comprise separate and distinct portions of a larger storage matrix. Data stores are, of course, well known in the art and a number of prior art storage arrangements might be advantageously utilized herein.

As previously indicated, the successive frames of incoming data are alternately written into the A and B stores. The five-bit write address information on leads 15 serves to designate the storage location or row for the parallel data word output from the data converter 13. And, successive data words are written into successive storage locations as the five-bit write address successively increments from 0 through 23.

The WA/WB (write A/write B) output of the write address circuit 14 alternately enables and thereby selects the data store (A or B) into which the 24 words of each frame are written. Thus, as the WA/WB waveform successively alternates, the successive incoming digroup frames are alternately written into the A and B stores.

Figure 4:
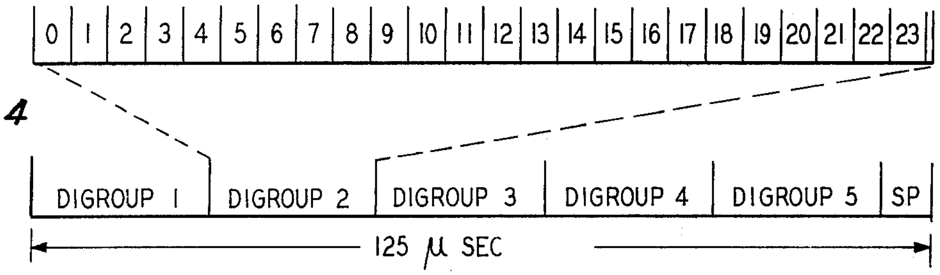
FIG. 4 illustrates the data format of a typical incoming multiplex line.

The line transmission rate is given as 1.544 MHz, there are 193 bits per frame, and the duration of each line frame is 125 microseconds, which is subdivided into channels of 5.18 microseconds each. This frame duration, in turn, establishes the internal frame duration of the switching office at a corresponding 125 microseconds. The office 125 microsecond frame is divided into 128 time periods, referred to hereinafter as time-slots or channels. Five digroups of 24 channels each are multiplexed on to a 128 time-slot bus, in the manner to be described, leaving eight spare time-slots. These spare time slots are used for maintenance test purposes, e.g., the last of the spare time slots is used to test the common control framing detector while the same is in service operation. Each write cycle or write operation requires an entire frame (125 microseconds). However, since five digroups are multiplexed on to a common bus in the same time duration (125 microseconds), as illustrated in FIG. 4, the read cycle of a given digroup is only about 20 percent of the time required for a write cycle.

Returning again to FIGS. 1 and 2, the read cycle will now be described. Amongst other timing signals, the office clock (not shown) generates GWC (generated word code) clock signals that serve to define the 128 time-slots of the office frame. These GWC clock signals are delivered over seven leads 21 ($2^7 = 128$) to the read decode logic 22. The logic circuitry 22 decodes these clock signals in a manner such that the five output leads 25 increment through a count of 0 through 23 for five successive cycles; in binary notation, at least five binary digits are required for a count of 24. It is this count or five-bit address information on leads 25 that is used to read the data words from the respective locations in all of the data stores. After five successive count cycles of 0 – 23 are registered on leads 25, the operation is interrupted for a period of eight time-slots (i.e., time-slots 120 – 127 which are spares) and then it repeats. The "read store select" lead 24 is energized for a predetermined one of the five cycles and it serves to enable the data read out of the digroup associated with stores A and B. There are four other "read store select" leads (not shown) and each is respectively energized during a given one of the five cycles to enable the read out of a given digroup.

The slip control circuit 26 generates an output signal RA/RB (read A/read B) which serves to alternately enable the read out from stores A and B; this output signal thus comprises part of the read address information for stores A and B. The RA/RB output waveform of slip control 26 is such that data is typically read out of stores A and B in an alternate fashion and read out is generally phase shifted with respect to write in such that the read out of one store occurs simultaneously with the write in to the other. However, when the read cycle effectively drifts or slips to a predetermined extent in either direction relative to the write cycle, the slip control 26 operates on the read cycle to discard a frame of data or to double-read a frame of data, depending on the relative direction of drift between the read and write cycles. It should be evident from the foregoing description that the decode logic 22 is common to all five digroups that are multiplexed together, but a slip control circuit 26 must be provided on a per digroup basis.

The recovered line timing used to write the data stores for a given line is typically not synchronized to the office timing used to read these stores and consequently more or less information can be written into the stores than is read out of them. The slip control circuit 26 deals with this problem by either discarding a frame of data or double-reading a frame of data, depending upon the relative drift between the read and write cycles. More specifically, if the recovered line frequency used to write the data stores is greater than the office frequency used to read these stores, the read waveform RA/RB will move or slip in a given direction relative to the write waveform WA/WB. This condition is designated as negative slip. After a predetermined amount of negative slip is experienced, the slip control 26 operates on the read cycle to cause a deletion of a frame of data (i.e., a frame of data in store B is discarded). Thereafter, the A and B stores are once again read in a continuous alternating fashion.

Alternatively, of course, the recovered line frequency may be somewhat less than the office frequency and hence the read waveform will move or slip in the opposite direction relative to the write waveform. This condition is designated as positive slip. After a predetermined amount of positive slip is experienced, the slip control operates on the read cycle to cause a double-reading of a given frame of data (i.e., a frame of data in store A is repeated). Thereafter, the A and B stores are once again read in a continuous alternating fashion.

The determination of this slip or drift, as well as the direction thereof, is accomplished by comparing the write cycle (WA/WB) for the digroup with predetermined time slot clock signals (e.g., TS00, TS05 and TS18) of the read cycle, which are derived from the read logic circuit 22. A slip operation is indicated by a signal on the slip output lead of circuit 26, and a positive slip (+) or negative slip (∓) output signal indicates whether a frame has been repeated or deleted.

The described slip operation achieves synchronization at a switching office, in an essentially asynchronous communication network, with a minimal of resultant impairment to the transmitted signals. A frame of multiplexed data comprises a plurality of distinct message words in distinct multiplexed channels of the frame and therefore one lost or duplicated digital word per message is not significant. Also, the frequency of a frame deletion or double-reading is small and it is always exactly one frame of data that is affected.

As the five "read store select" leads (e.g., lead 24) of decoder 22 are successively energized the data stores of five digroups are read in succession and the digroups multiplexed together in multiplexer 27 to form a multiplexed bit stream as depicted in FIG. 4. Thus, the 24 channels of digroup 1 are read, then the 24 channels of digroup 2, and so on for the other three digroups. The eight spare time slots (SP) separate the data from channel 23 of digroup 5 and channel 0 of digroup 1. The data words are read out of store in a parallel format and they remain in a parallel format on the common bus 28.

With the exception of the slip control circuit 26, the individual circuits recited above and shown in block form in FIG. 1 of the drawings are considered to be well known in the art and amply described in the literature. The slip control circuit is disclosed in detail in the copending application of J. R. Colton and H. Mann, Ser. No. 427,068, filed Dec. 21, 1973.

The time division multiplexed digital data groups are delivered to a switching network (not shown) over the common multiplex bus 28. The framing detector 20 continually and independently monitors, at the multiplex point, all of the digital groups (and test time-slots which comprise a test digroup) on a time multiplexed basis. Briefly, the framing detector 20 examines each digroup for frame synchronization by comparing the framing bits thereof against a locally generated framing pattern. If the comparison is successful, the digroup is in-frame and no corrective action need be taken. If the comparison fails, however, an out-of-frame condition is indicated and a "hunting" procedure is initiated by sending an appropriate signal to the reframer 30. In response, a "shift address" signal is sent from the reframer 30 to the reframe shift logic 31, of FIG. 1, for the purpose of temporarily interrupting the counting operation of the write address circuit 14. This hunting operation continues, and the count of circuit 14 is continually interrupted, until an in-frame condition is once again realized, i.e., the digroup framing bits on the bus 28 are once again successfully compared with the locally generated framing pattern.

The reframer 30 can be a time-shared reframer of a known configuration since loss of frame is a relatively infrequent occurrence. Alternatively, of course, a reframer can be provided on a per-digroup basis, i.e., one reframer per digroup. The art is replete with reframers and so no detailed description of the same is deemed necessary for purposes of the present invention. Furthermore, the reframe algorithm plays no part in the operation of the present invention. As with most reframe algorithms, the data is typically transmitted through the terminal during the process of reframing.

Turning now to the common control framing detector of the invention, the framing pattern status of each digroup is stored in a shared recirculating memory, which is continually updated in accordance with changes introduced into each digroup signal by the switching machine for synchronization (i.e., + or ∓ SLIP) and reframe purposes. This operation is carried out by the framing pattern status store 32 which is comprised of a pair of six-bit shift registers 33, that provide the requisite memory, and the update logic 34, which updates or alters the stored status information of each digroup, as required. The framing pattern checker 35 serves to compare the stored framing pattern status of each digroup with the digroup framing bits (D9) as each digroup appears on the multiplex bus 28. If this comparison fails, an error signal (E) is generated. A shared, error timing store 36 linearly counts the error signals for each digroup and when the error count of a given digroup reaches or exceeds a predetermined threshold (E = 15) an out-of-frame indication is generated. The error timing store 36 comprises four six-bit shift registers 37 and the error addition logic 38. Four bits are required to register an error count of up to 15 and hence the need for four, parallel shift registers. The error addition logic 38 serves to up-count, or down-count, the stored error count for each digroup. The in-frame status store 40 maintains a real-time record of the in-frame, or out-of-frame, status for each digroup (and test time-slots). The real-time record is stored in the six-bit shift register 41. If a particular digroup is in frame its frame status store signal remains in-frame (IF) until the error timing store 36 reaches the error count threshold; at that time, the status change logic 42 responds to a signal from the error timing store 36 to change the stored status for the digroup to $\overline{IF}$. After framing has been recaptured, the error timing store 36 sends an appropriate signal to the logic circuit 42 to change the stored status of the digroup back to IF. The stored out-of-frame ($\overline{IF}$) status of a digroup serves to initiate a reframe algorithm in the manner briefly described above.

The incoming T1 transmission lines, such as line 11, transmit framing information in the 193rd pulse position of every other frame. Thus, the framing pattern which results is as follows:

—1—X—0—X—1—X—0—

The alternating 1 and 0 bits are, of course, the valid framing bits. The frames which do not contain valid framing bits are called signaling subframes and the 193rd bvits of these frames are used to send signaling information, which for present purposes can be disregarded.

Figure 5:
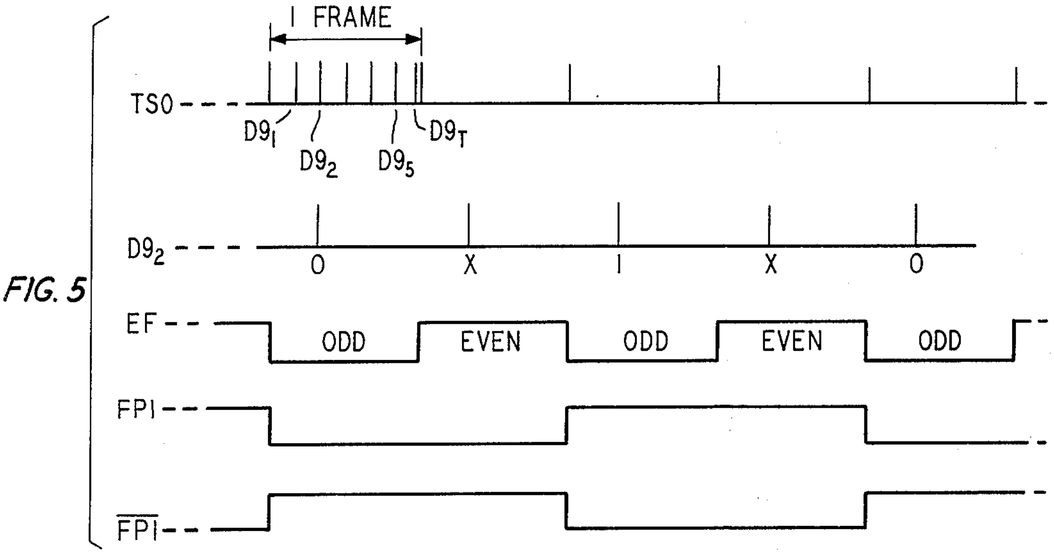
FIG. 5 shows waveforms generated by the office clock, which are utilized in the several circuits of the framing detector of the invention.

A local framing pattern is generated directly from the office clock (not shown). As illustrated in FIG. 5, the framing pattern FP1 is high and low for two frames. The waveform $\overline{\textbf{FP1}}$ is, of course, simply the inverse of FP1. A waveform EF is also available to denote odd and even frames. Both the FP1 and EF waveforms change state at the beginning of time slot zero (TS0) of the 125 microsecond office cycle.

The FP1 waveform completes a full cycle in four frames, while the EF waveform alternates every frame. Also, in a period of four frames the framing pattern of an in-frame digroup may be disposed in any one of four ways, namely:

0—X—1—X—
X—0—X—1—
1—X—0—X—
X—1—X—0—

It should thus be apparent that the framing pattern state of a digroup can be defined in terms of the EF (odd/even) and FP1 (or $\overline{\textbf{FP1}}$) office waveforms.

Two, state variables are used to define the state of the framing pattern for each digroup (and test digroup). The first state variable defines the framing pattern of a digroup in terms of odd (0) or even (1) frames of the EF waveform. That is, the D9 framing bits of a digroup may occur in either the odd or even frames of EF, but not both since valid forming bits are transmitted every other frame. The second state variable defines the framing pattern of the digroup in terms of the FP1 or $\overline{\textbf{FP1}}$ waveforms. That is, the digroup framing pattern may compare or correspond to FP1(0) or to $\overline{\textbf{FP1}}$(1) depending on whether the digroup framing pattern is 01010... or the inverse 10101.... Consider, by way of example, the $D9_2$ waveform of FIG. 5, which represents the 193rd or D9 bits of digroup 2. The 0 and 1 bits are valid framing bits and they occur in the odd (0) frames of EF; the intervening signal information bits (X) occur in even frames and are ignored. Also, the 0101... pattern of the framing bits compares with the low and high states of the FP1 waveform. Thus, if the odd frames of EF are designated 0 and FP1 is also designated 0 ($\overline{\textbf{FP1}}$ = 1), then the two state variables for the digroup is 00. By way of further example, if we assume the $D9_2$ framing pattern of FIG. 5 is shifted one frame to the right, then the two state variables would be 01; and, if it were shifted two frames to the right, the two state variables would be 10.

The following table summarizes the four possible states of a digroup's framing pattern in terms of the odd/even (EF) and FP1 (or $\overline{FP1}$) waveforms:

| State | FP1/$\overline{FP1}$ | Odd/Even |
|---|---|---|
| 0 | 0 | 0 |
| 1 | 0 | 1 |
| 2 | 1 | 0 |
| 3 | 1 | 1 |

At any given point in time, the framing pattern status of a given digroup may be in any one of the four tabulated states. And the respective states of the multiplexed digroups (and test digroup) are completely random. That is, any digroup can be in any state without regard to the framing pattern states of the other multiplexed digroups.

Figure 6:
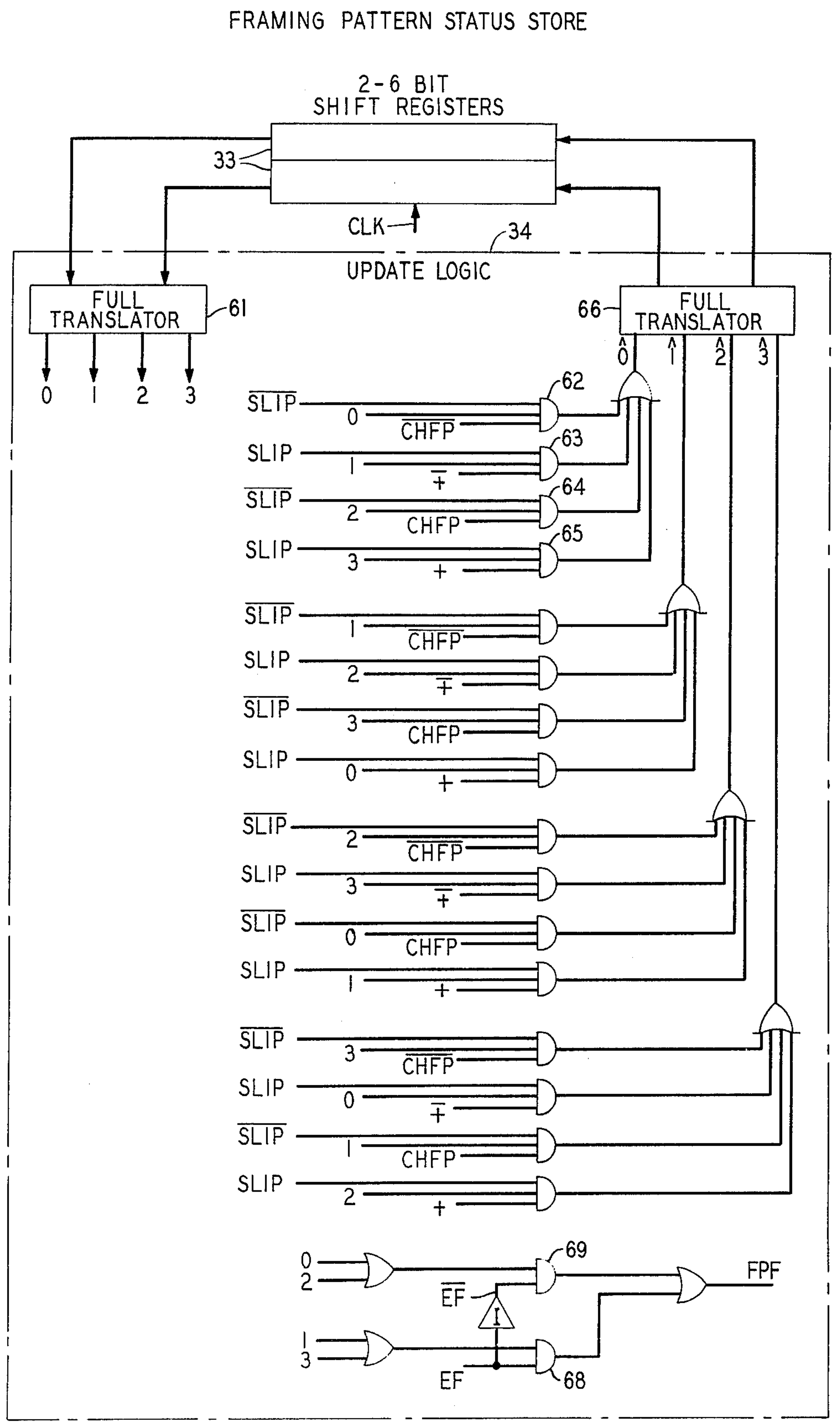
FIG. 6 is a detailed schematic diagram of the framing pattern status store circuit of FIG. 2.

The two state variables, that define the framing pattern status for each of the digroups (and test digroup), are stored in the pair of six-bit shift registers 33 of FIGS. 2 and 6. To store the framing pattern status for all five digroups and the test digroup (which is treated as a digroup of eight time slots, that is, a virtual digroup) a pair of registers of six-bit length are required. At any point in time, the corresponding cells of registers 33 will temporarily store the two state variables (each variable being either a binary 1 or 0) for a given digroup. The registers 33 are shifted by clock (CLK) signals derived from the office clock and which shift the stored data at the beginning of time slots 0, 24, 48, 72, 96 and 120. Thus, for example, at the beginning of time slot 0 of the office cycle or frame, the binary coded framing state of digroup 1 will appear at the output of the shift registers 33 and the stored states of the other digroups will be advanced one cell position toward the output. The binary coded state of digroup 1 is then updated by the logic circuit 34, if required and in the manner to be described, and then returned to the input of the registers 33 where it is subsequently advanced or shifted once again toward the register output. At the beginning of time slot 24 of the office cycle, the binary coded framing state of digroup 2 will be shifted to the output of the shift registers 33 from where it is coupled to the update logic 34. Concurrently therewith, the stored states of the other digroups are each advanced in the registers 33 one cell position. In this fashion, the two state variables for all the digroups, including the test time-slot "digroup," will be continually advanced through the shift registers 33 and then fed back to the input stages thereof via the update logic 34.

Figure 9:
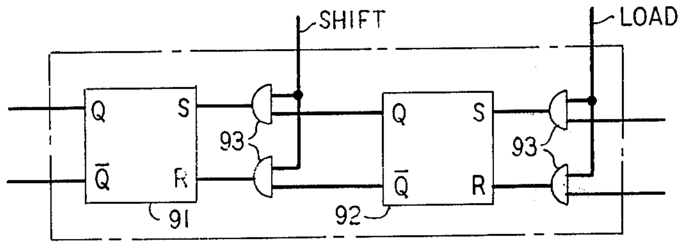
FIG. 9 is a schematic diagram of a single memory cell of which all of the six-bit shift registers of FIG. 2 are comprised.

The shift registers 33, as well as the shift registers 37 and 41, are each comprised of six memory cells, with each cell configured as shown in FIG. 9. A typical memory cell consists of a pair of tandem coupled flip-flops 91 and 92 and the clock gate logic 93. A binary data bit (i.e., a state variable) is read into the input flip-flop 92 during each of the last, digroup time-slots and the data is shifted from flip-flop 92 to the output flip-flop 91 during each of the first, digroup time slots. Thus, the shift occurs during time slots 0, 24, 48, 72, 96 and 120 of the office cycle, while the read in or "load" for each cell occurs during the preceding time-slots 127, 23, 47, 71, 95 and 119 of the office cycle.

The framing pattern status store 32 and in particular the update logic 34 are shown in the detailed schematic diagram of FIG. 6. As explained heretofore, the slip control 26 of FIG. 1 may operate to discard a frame of data or to double-read a frame of data and will therefore introduce changes in the framing pattern of a digroup. Such a change must, of course, be accounted for in the framing pattern state that is stored in circuit 32. Also, after a reframe operation the framing pattern may be the inverse of the pattern before reframing was initiated and thus the framing pattern state that is stored in status store 32 may also have to be changed accordingly.

Slip introduces transitions among the four states of the system. The algorithm which is used to compensate the framing detector for the effects of slip consists of two statements. (1) When a slip occurs, reverse the odd/even state variable for that digroup. (2) If slip is in the positive direction (a frame is repeated) and the odd/even state variable was even, change the framing pattern state variable (PF1/$\overline{FP1}$); if slip is in the negative direction (a frame is deleted) and the odd/even state variable was odd, change the framing pattern state variable; otherwise, the framing pattern state variable remains the same.

The above-recited algorithm can perhaps be better understood by considering the two examples below in conjunction with the wave forms of FIG. 5:

1—X—1—X—0—X—1—
0—0—X—1—X—0—X— (1)

0—X—1—X—0—X—1—
0—1—X—0—X—1—X— (2)

The first row of both the above examples shows a typical framing pattern (e.g., $D9_2$). In the second row of example (1) a positive slip is assumed and hence a frame and its 193rd or D9 bit (0) is repeated. This effectively shifts the entire framing pattern one frame to the right. In the second row of example (2) a negative slip is assumed and hence a frame and its 193rd or D9 bit (X) is deleted. This shifts the entire framing pattern one frame to the left. For either slip condition it is intuitively clear that the stored odd/even state variable for the digroup must be reversed. That is, if the D9 framing bits occurred during odd frames of EF, they will now (after a slip operation) occur during the even frames and vice versa.

Turning now to the second (2) statement of the above algorithm, it will also be evident that if the odd-/even state variable is odd (i.e., D9 framing bits occur during odd frames of EF), shifting the framing pattern one frame to the right (due to a positive slip) will not necessitate a change in the framing pattern state variable (FP1/$\overline{FP1}$). Whereas, if the odd/even state variable is even (i.e., D9 framing bits occur during even frames of EF), shifting the framing pattern one frame to the right will necessitate a change in the framing pattern state variable. In a similar manner, it will be evident from FIG. 5 that if the odd/even state variable is odd (i.e., D9 framing bits occur during odd frames of EF), shifting the framing pattern one frame to the left (due to negative slip, as shown in example (2), supra) will require a change in the framing pattern state variable (FP1/$\overline{FP1}$).

Figure 7:
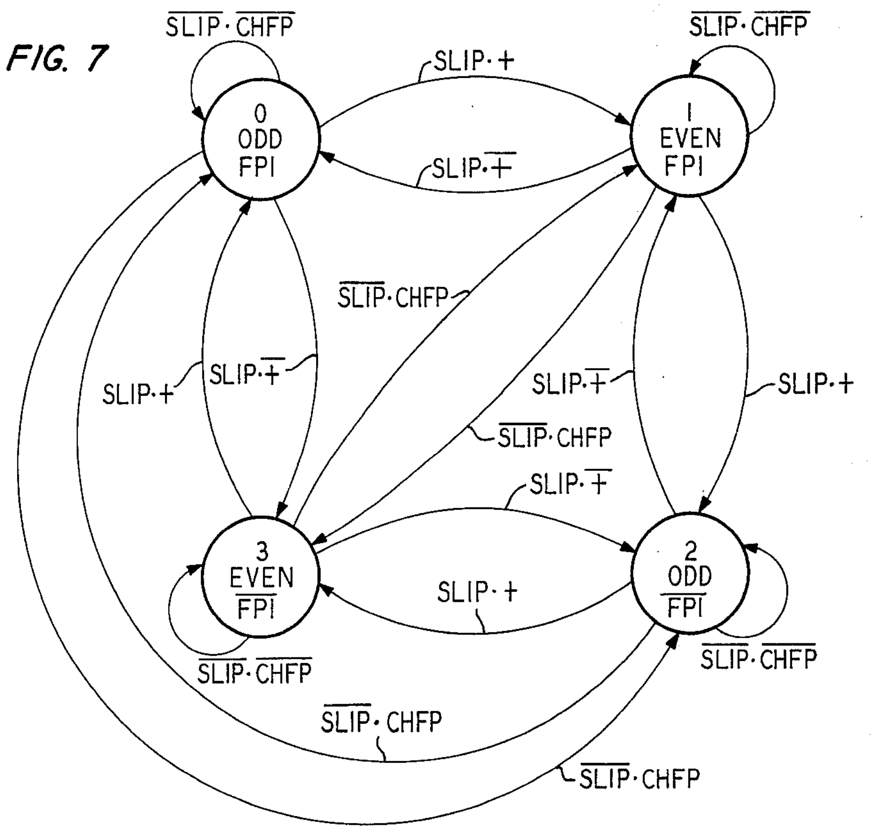
FIG. 7 is a state diagram that is descriptive of the operation of the circuit of FIG. 6.

The state diagram for the framing detector algorithm, supra, is shown in FIG. 7. The two state variables, denoted odd/even and FP1/$\overline{FP1}$, are represented by the four states 0, 1, 2 and 3, as previously tabulated. For each of these four states, if a negative slip occurs (SLIP . ∓), the odd/even state variable is changed, and the framing pattern state variable (FP1/$\overline{FP1}$) is changed if the old state was old. Thus, for example, if a digroup framing pattern state happens to be state 0 and a negative slip occurs (SLIP . ∓), the odd/even state variable and the framing pattern state variable are both changed and the new framing pattern state is therefore state 3. Likewise, if the framing pattern state happens to be state 2, a negative slip will result in a change to state 1. Alternatively, if the framing pattern state is assumed to be in either state 1 or 3 (i.e., the odd/even state variable is even), the framing pattern state variable (FP1/$\overline{FP1}$) remains the same and state 1 is changed to state 0 and state 3 to state 2.

If a positive slip occurs (SLIP . +), the odd/even state variable is changed, and the framing pattern state variable (FP1/$\overline{FP1}$) is changed if the old state was even. Accordingly, and by way of further example, if a digroup framing pattern state happens to be state 1 and a positive slip occurs (SLIP . +), the odd/even state variable and the framing pattern state variable are both changed and the new framing pattern state is thus state 2. Similarly, if the framing pattern state happens to be state 3, a positive slip will result in a change to state 0. Alternatively, if the framing pattern state happens to be either state 0 or 2 (i.e., the odd/even state variable is odd), the framing pattern state variable (FP1/$\overline{FP1}$) remains the same, and state 0 is changed to state 1 and state 2 to state 3 in response to a positive slip (SLIP . +).

In the absence of slip or a signal to change the framing pattern from the reframe circuit (CHFP), the digroup remains in the same state. Thus, in FIG. 7 when neither a slip nor a change in the framing pattern is indicated (i.e., $\overline{SLIP}$ . $\overline{CHFP}$), the digroup state remains the same. The CHFP signal is generated by the reframe circuit 30, as a result of a reframing operation, to change the framing pattern state variable while keeping the odd/even state variable the same. If the framing pattern prior to reframing is different from the pattern after framing is recaptured, a CHFP signal is generated by the reframer. Thus in FIG. 7, if the framing pattern state is either 1 or 3 and a CHFP signal is received by the framing pattern status store 32, the state is respectively changed to 3 or 1; if the framing pattern state is either 0 or 2, a CHFP signal will change the same to 2 or 0, respectively.

FIG. 6 shows the circuit which implements the state diagram of FIG. 7. The two-state variable output signal from the shift registers 33 is delivered to the output full translator 61, which converts the binary code to a one out of four code. The combinational logic (i.e., the non-minimal AND-OR gate logic) determines the next framing pattern state for a digroup, based on the present state and the input signals SLIP, +, ∓ and CHFP. The circumflexed numerals (i.e., $\hat{0}$, $\hat{1}$, $\hat{2}$, $\hat{3}$) represent the next framing pattern state for a digroup, which may be, and usually will be, the same as the present state. For purposes of explanation consider the generation of the next state designated $\hat{0}$. As seen from the state diagram of FIG. 7, the framing pattern state 0 (in FIG. 6, $\hat{0}$) will be established under four different conditions. First, if neither a slip nor a change in the framing pattern is indicated (i.e., $\overline{SLIP}$, $\overline{CHFP}$), the digroup state remains in the same (0) state; this function is provided by the AND gate 62. If the present state of the digroup is state 1 and a negative slip occurs (SLIP . ∓), the AND gate 63 is enabled and the framing pattern state for this digroup is changed to 0. If the digroup is presently in state 2, a CHFP signal will enable AND gate 64, in the absence of slip ($\overline{SLIP}$), and the digroup framing pattern state will thus be changed to 0. Lastly, if the present digroup state is state 3 and a positive slip has occurred (SLIP . +) the AND gate 65 will be enabled to change the state to state 0.

The manner in which the framing pattern states $\hat{1}$, $\hat{2}$ and $\hat{3}$ (in FIG. 6, 1, 2 and 3) are produced should be evident from the foregoing explanation, and a comparison of the logic circuit of FIG. 6 with the state diagram of FIG. 7. The full translator 66 converts the one out of four code to a binary code which is then loaded into the shift registers 33. Thus, the framing pattern state of each digroup is clocked out of the registers 33 during the first digroup time slot (e.g., TS0), revised if necessary in the combinational logic, and then loaded into the input cells of the registers 33 during the last digroup time slot (e.g., TS23). In this manner, the framing pattern state of all the digroups and test time slots are continually recycled in status store 32, and periodically updated or altered in response to slip and CHFP signals.

As shown in FIG. 6, a framing pulse frame indication (FPF) is generated whenever a digroup is in states 1 or 3 with EF = 1 or in states 0 or 2 with EF = 0 ($\overline{EF}$ = 1). Thus, if the digroup is in states 1 or 3 and EF is high (EF = 1), the AND gate 68 is enabled to produce the FPF signal. If the digroup is in states 0 or 2 and EF is low (EF = 0, and $\overline{EF}$ = 1), the AND gate 69 is enabled to produce the FPF signal. A framing pulse frame indication (FPF) for a digroup is defined as a matching of the state of EF and the odd/even state variable for that digroup. As the name implies a framing pulse frame signal (FPF) is used to distinguish those frames which include framing bits from those frames (i.e., signaling subframes) which do not.

Figure 8:
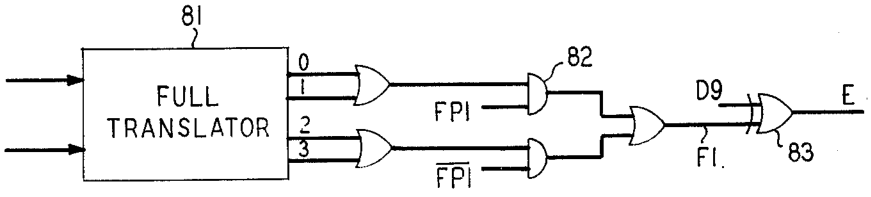
FIG. 8 is a schematic diagram of the framing pattern checker of FIG. 2.

The binary coded, two-state variable, output signal of shift registers 33 is delivered to the framing pattern checker circuit 35, shown in detail in FIG. 8. The full translator 81 converts the two-state variable signal to a one out of four code in the same manner as the translator 61 of FIG. 6. In practice, a one out of four code signal is not separately developed in the checker circuit 35, but rather the one out of four code output of translator 61 is utilized. The D9 bits are compared with a locally generated framing pattern F1, which is FP1 if a digroup's framing pattern state is in states 0 or 1, and is $\overline{FP1}$ if it is in states 2 or 3. For example, if the framing pattern state of a digroup is assumed to be in states 0 or 1, the AND gate 82 will be enabled and the D9 bits of the digroup will be compared to FP1 which, it will be recalled, alternates in polarity every two frames. If the digroup is in-frame, its D9 framing bits on bus 28 will also alternate in polarity (01010...) in the same fashion every other frame. Thus, if F1 compares with D9, as it most often will, there is no error. Whereas, if F1 does not compare with D9 (i.e., F1 ⊕ D9 = 1) an error (E) is generated. This comparison function is performed by the exclusive-OR gate 83 (⊕ is the Boolean symbol for this operation).

At first instance, this framing comparison would seem to be a gross one and not likely to catch small changes or phase shifts in framing (e.g., those on the order of several bit positions). However, because of the way data is stored and read out, in parallel, it will be evident that even a one bit displacement of the D9 framing bits will result in an error (E) signal. That is, if the D9 framing bits are displaced even one bit position they will appear, on read out, on an output rail other than the D9 output rail. Accordingly, a framing check will be made against another bit, most likely a data bit, and as a result error (E) signals will be generated by the checker circuit 35.

An error (E) signal may, of course, be generated during the signaling subframes since the D9 bits (X) in this instance will not alternate in exactly the same fashion as FP1 or $\overline{\text{FP1}}$. However, as will be evident hereinafter, these error signals are discriminated against by the use of the FPF signal which distinguishes the framing pulse frames; i.e., only those error (E) signals that are generated during a framing pulse frame are taken into account.

Figure 10:
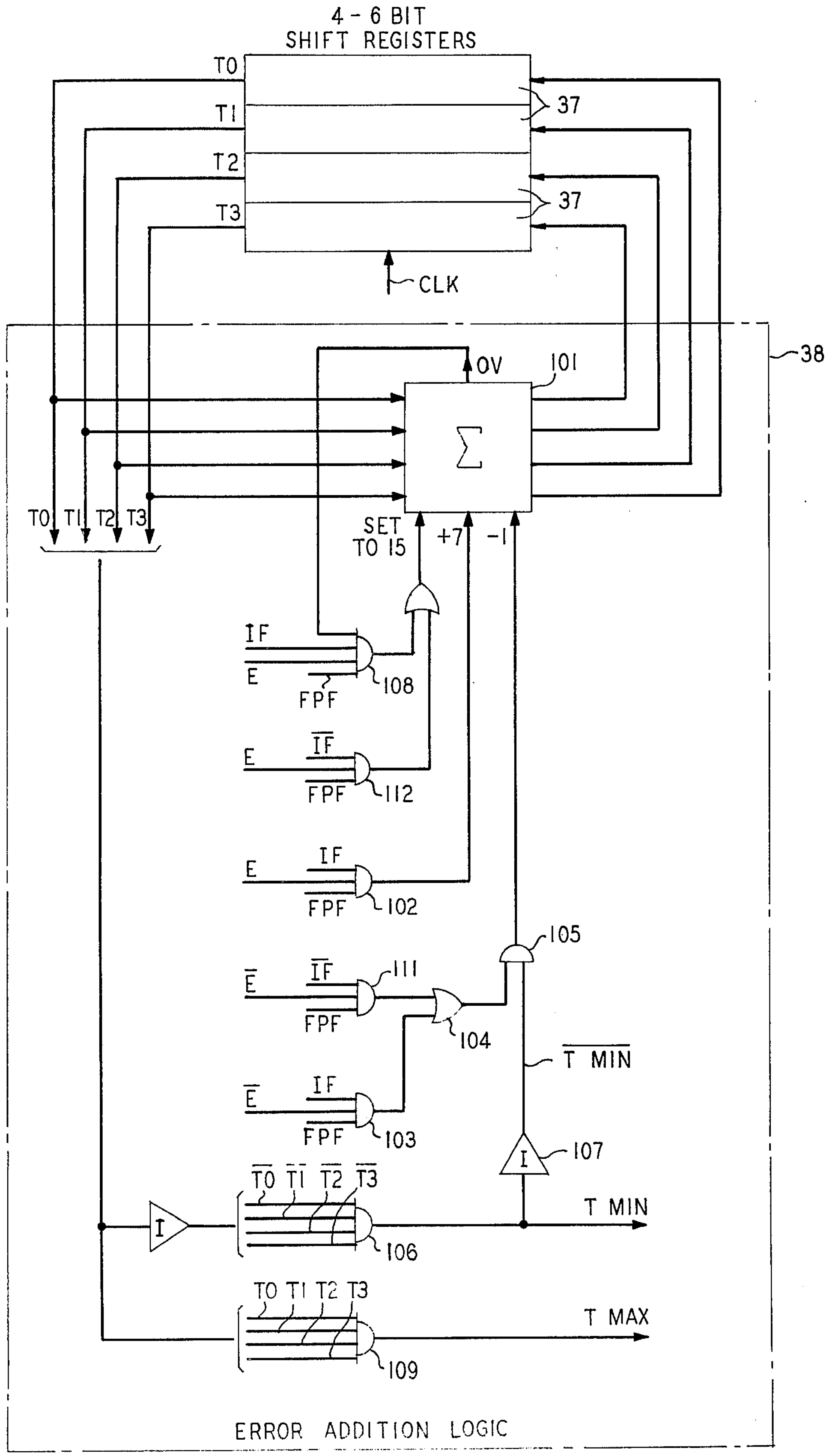
FIG. 10 is a detailed schematic diagram of the error timing store of FIG. 2.

The error (E) signals from the framing pattern checker 35 are delivered to the error timing store 36, shown in detail in FIG. 10 of the drawings. The error timing store consists of four six-bit shift registers 37, a four-bit binary adder 101 and combinational logic (i.e., the non-minimal AND-OR gate circuitry). The registers 37 store the binary coded count from 0 to 15 for each of the five digroups and the test digroup (i.e., a virtual digroup of eight time slots). Four bits are, of course, required to register an error count of up to 15 and hence the need for four parallel shift registers. At any point in time, the corresponding cells of the registers 37 will temporarily store the error count for a given digroup. The registers 37 are shifted and loaded by clock (CLK) signals in exactly the same manner as the shift registers 33. Each of the cells of the registers 37 is also configured as shown in FIG. 9. To store the error count for all five digroups and the virtual digroup, the registers 37 must be of 6-bit length. The binary adder 101 is used to increment and decrement the accumulated error count for each digroup. The combinational logic delivers signals to the binary adder 101 so as to add seven counts (+7) to, or subtract one count (−1) from, the accumulated count for each digroup. Subtraction of one count is accomplished by the addition of the 2's complement of 0001 (or 1111). The binary adder 101 may also be set to the 1111 state by the overriding "set to 15" lead. Binary adders are well known in the art and hence no detailed description thereof is considered necessary. Moreover, it will also be evident to those in the art that the invention is in no way limited to the indicated count increment (+7) and count decrement (−1). Depending upon the received signal statistics, anticipated errors, etc., other and different count increments and/or decrements may be called for.

The combinational AND-OR logic serves to increment or decrement the stored error count in response to error (E) signals provided by the framing pattern checker 35. The other input signals to the combinational logic comprise a framing pulse frame (FPF) indication and in frame (IF) or out of frame ($\overline{\text{IF}}$) signals derived from the in-frame status store 40. When a particular digroup is in frame (IF) and an error (E = 1) is recorded by the framing checker 35 during a framing pulse frame (FPF) for that digroup, the combinational logic adds seven counts (+7) to the state of the error timing store. This function is provided by the AND gate 102. If a particular digroup is in frame (IF) and no error ($\overline{\text{E}}$) is recorded by the framing pattern checker 35 during a framing pulse frame (FPF), one count (−1) is subtracted from the state of the error timing store unless the timing store is already in the all zeros (T MIN) condition. This (−1) decrement signal is provided by the AND gate 103 whose output is coupled via the OR gate 104 and the AND gate 105 to the binary adder 101. If the output of the shift registers 37 is in the all zeros condition (TO = T1 = T2 = T3 = 0) the AND gate 106 is enabled to generate a T MIN signal. The T MIN signal is, therefore, indicative of the fact that the error count is 0 for the digroup. A (−1) decrement count at this point would cause a carry out of the least significant cell in the shift registers 37, which must be prevented. The inverter 107 is used to perform this function. If an all zeros condition exists (T MIN = 1) the output of inverter 107 serves to disable the AND gate 105 and thereby prevent a one count subtraction. The AND gate 105 is disabled when, and only when, the error count is 0 (T MIN = 1). If the addition of a +7 count to the error timing store causes a carry out of the most significant cell, an overflow (OV) signal is generated and the binary adder 101 is set to the 1111 state by means of the "set to 15" control signal. This "set to 15" signal is generated by the AND gate 108. When the error count of the timing store is in the all ones condition (1111) the AND gate 109 is enabled to generate the T MAX indication. The T MIN and T MAX signals are coupled to the in-frame status store 40 for a purpose to be described.

When a particular digroup is out of frame ($\overline{\text{IF}}$) during a framing pulse frame (FPF), e.g., during a reframe operation, but no error ($\overline{\text{E}}$) is recorded by the framing pattern checker 35, one count is subtracted from the state of the error timing store. This decrement signal is generated by the AND gate 111, which is coupled to the binary adder 101 via the OR gate 104 and the AND gate 105. The error count will, in this fashion, be continually decremented to 0, at which point the AND gate 105 is disabled in the manner described. However, if a pattern violation occurs (E = 1) while the error count for the out of frame ($\overline{\text{IF}}$) digroup is in the process of being decremented to 0, the AND gate 112 is enabled so as to deliver a "set to 15" signal to the binary adder 101. During the subframes ($\overline{\text{FPF}}$), the state of the error timing store is recirculated.

During an out of frame ($\overline{\text{IF}}$) condition of a digroup the error count in the error timing store 36 may alternatively, and perhaps preferably, be incremented and decremented by shift (SHIFT) signals from the reframer 30. A SHIFT signal is indicative of the fact that the reframer is still "hunting" and the digroup is thus still out of frame; whereas, the inverse ($\overline{\text{SHIFT}}$) is indicative of the fact that framing may have been recaptured. Thus, a SHIFT indication can be utilized with the appropriate combinational logic to generate a "set to 15" signal, while a $\overline{\text{SHIFT}}$ indication will decrement the error count by one (−1).

The error count of each digroup, including the virtual digroup, is clocked out of the registers 37 during the first, digroup time slot (e.g., TSO), revised by addition or subtraction as required in the binary adder 101, and then strobed or loaded into the input cells of the registers 37 during the last, digroup time slot (e.g., TS23).

Figure 11:
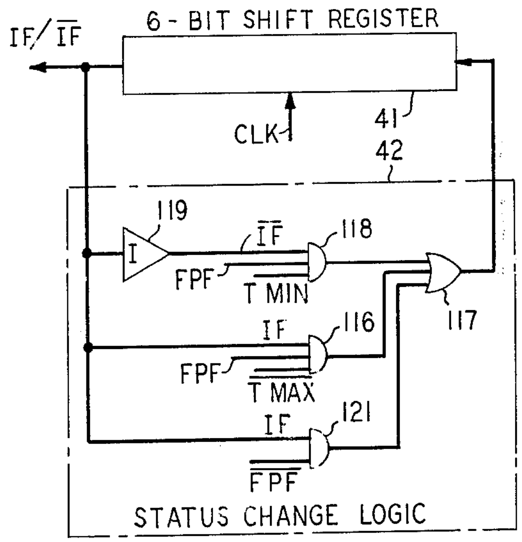
FIG. 11 is a schematic diagram of the in-frame status store circuit of FIG. 2.

The in-frame status store 40 shown in detail in FIG. 11, records the in frame (IF) or out of frame ($\overline{\text{IF}}$) status for each active digroup, as well as the virtual digroup.

This record is stored in the six-bit shift register 41, which is clocked (CLK) and configured in the same fashion as the previously described six-bit shift registers 33 and 37. For an in frame digroup a binary one bit is stored (IF = 1), while for an out of frame digroup a binary zero is stored ($\overline{IF}$ = 0). If a particular digroup is in frame (IF), the digroup remains in frame until the error timing store 36 achieves the 1111 (T MAX) state, and at that time the status for the digroup is changed to $\overline{IF}$. Thus, until the error timing store reaches the maximum count (T MAX = 1) the IF = 1 bits are coupled from the output of the shift register 41 to the input thereof via the enabled AND gate 116 and the OR gate 117. When a maximum error count is achieved (T MAX = 1 and $\overline{T\ MAX}$ = 0), the AND gate 116 is disabled and the status of the digroup is changed at that time to $\overline{IF}$ (0). If a digroup is out of frame (IF), it remains in that state until the reframe circuit has located the correct framing bit and has counted 15 consecutive framing bits without a pattern violation. This results in an error timing store count of 0000 (T MIN), which causes the status of the digroup to be changed to IF. Thus, for an out of frame ($\overline{IF}$) digroup, the AND gate 118 is normally disabled and as a result the $\overline{IF}$ (0) indication for the degroup is recirculated. However, when T MIN = 1 (i.e., framing has been recaptured) the AND gate 118 is enabled and acts with inverter 119 to change the digroup's stored state to IF (1). During the subframes ($\overline{FPF}$) of a digroup, the status for that digroup is recirculated via the AND gate 121. For example, for an in frame digroup the binary one bit output of shift register 41 is recirculated via the enabled AND gate 121; whereas, for an out of frame ($\overline{IF}$) digroup the binary zero input to the AND gate 121 results in a binary zero reinsertion into the shift register 41.

Figure 12:
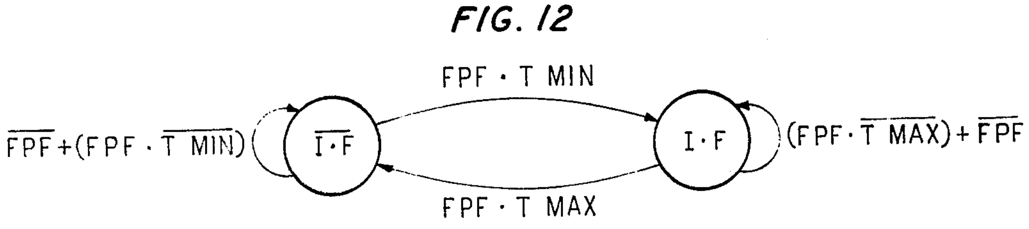
FIG. 12 is a state diagram descriptive of the operation of the circuit of FIG. 11.

FIG. 12 shows the state diagram for the in-frame status store. Any digroup can be in either of the two states IF or $\overline{IF}$. If the state of a digroup is IF, the digroup remains in that state during the subframes ($\overline{FPF}$), as well as during the framing pulse frames (FPF) so long as the error count is less than 15 (T MAX). The Boolean expression summarizing these two conditions, for continued IF, is: (FPF . $\overline{T\ MAX}$) + $\overline{FPF}$. When the error timing store reaches the maximum count of 15 (FPF . T MAX), the state of the digroup is changed to $\overline{IF}$. In a similar fashion, if the state of a digroup is $\overline{IF}$, the digroup remains in that state during the subframes ($\overline{FPF}$), as well as during the framing pulse frames (FPF) until the error count goes to 0000 (T MIN), at which time the state of the digroup is changed to IF.

The system disclosed in FIGS. 1 and 2 is self-synchronizing. When a digroup is activated or placed on line its framing pattern may or may not match the framing pattern state in status store 32. The stored, framing pattern state will be in one of four random states and hence it is unlikely that the digroup framing pattern will match the same. Accordingly, the framing pattern checker 35 will immediately generate error (E) signals which will initiate a reframing action. The reframer 30 successively interrupts the counting operation of the write address circuit and in a relatively short time (on average < 25 msec.) an in frame condition is realized and the framing pattern is brought into match with the stored, framing pattern state.

It is a particular advantage, realized in the common control framing detector of the invention, that maintenance testing can be carried out with great facility. For example, a test vector (i.e., D1–D8 test data bits and a test D9 bit) can be inserted in the last time slot (TS 127) of the virtual digroup and the performance of the common control circuitry thereby monitored at selected points while in service operation. The test vector is inserted at the multiplex point by strobing, for example, the bits stored in a ROM (read only memory). The test bits can, of course, also be inserted under central processor control. It will be further evident that test bits can be provided to simulate + or ∓ slip, cause an out of frame ($\overline{IF}$) condition in the test digroup, etc. The common control circuitry is monitored at selected points (e.g., the T MAX or T MIN output of error timing store 36, the IF/$\overline{IF}$ output of the status store 40, etc.) and failures can thus be quickly detected and isolated. And, importantly, these maintenance procedures can be continuously carried out with the equipment in normal service operation.

The above described arrangement is considered to be merely illustrative of the application of the principles of the present invention and numerous modifications thereof may be devised by those skilled in the art without departing from the spirit and scope of the invention.

What is claimed is:

1. In a time division multiplex system wherein a plurality of digital groups of time division multiplex channels are time multiplexed together on to a common transmission link, each digital group including a similar predetermined framing bit pattern; a common control framing detector comprising means including a shared recirculating memory for storing the framing pattern status of each digital group, means for updating the stored framing pattern status of each digital group in accordance with changes introduced into each of the multiplexed digital groups by the multiplex system, means for comparing the stored framing pattern status of each digital group with the framing bits of the group as the latter appears on the common transmission link and for generating an error signal when the comparison fails, means including a shared recirculating memory for maintaining an error count for each digital group, means for respectively incrementing the error count for each digital group in response to a generated error signal and for respectively decrementing the error count in the absence of an error signal, and means for producing an out-of-frame signal when the error count for a digital group reaches a predetermined threshold.

2. A common control framing detector as defined in claim 1 including means for maintaining a real-time record of the in-frame or out-of-frame status for each digital group.

3. A common control framing detector as defined in claim 2 wherein an in-frame status record of a digital group is changed to the out-of-frame status in response to said out-of-frame signal.

4. A common control framing detector as defined in claim 2 wherein the means for maintaining a real-time record comprises a shared recirculating memory.

5. A common control framing detector as defined in claim 4 wherein the shared recirculating memories comprise shift registers that are clocked in time coincidence with the appearance of the digital groups on the multiplexed transmission link.

6. A common control framing detector as defined in claim 5 wherein each of the shift registers comprises a number of cells that exceed by one the number of multiplexed digital groups.

7. A common control framing detector as defined in claim 6 wherein said error count is incremented by seven in response to an error signal and is decremented by one in the absence of an error signal.

8. A common control framing detector as defined in claim 7 including means for producing an in-frame indication when the error count for a digital group reaches a predetermined minimum.

9. A common control framing detector as defined in claim 8 including means for changing an out-of-frame status record to the in-frame status in response to said in-frame indication.

10. A time division system as defined in claim 1 wherein said system comprises a switching machine which intermittently introduces changes into each of the multiplexed digital groups for synchronization and reframing purposes.

11. In a time division switching machine wherein *n* digital groups of time division multiplexed channels are time multiplexed together on to a common bus, each digital group including a similar predetermined framing bit pattern; a common control framing detector comprising a shared recirculating memory for storing the framing pattern state of each digital group, means for continually updating the stored framing pattern state of each digital group in accordance with changes introduced into each of the multiplexed digital groups by the switching machine for synchronization and reframing purposes, framing pattern checker means coupled to the output of said shared memory for comparing the stored framing pattern state of each digital group with the framing bits of said group as the latter appears on the common multiplexed bus, said checker means serving to generate an error signal whenever the comparison fails, means including a shared recirculating memory for maintaining an error ccount for each digital group, means for respectively incrementing the error count for each digital group in response to a generated error signal and for respectively decrementing the error count in the absence of an error signal, means for producing an in-frame indication when the error count for a digital group is at a given minimum count and for producing an out-of-frame indication when the error count reaches a predetermined maximum, and means including a shared recirculating memory responsive to said in-frame and out-of-frame indications to maintain a real-time record of the in-frame or out-of-frame status for each digital group.

12. In a time division switching machine as defined in claim 11, wherein said shared recirculating memories comprise shift registers which are clocked in time coincidence with the appearance of the digital groups on the multiplexed common bus, each of said shift registers having a number of tandem coupled cells that exceed by one the number *n*.

* * * * *

UNITED STATES PATENT AND TRADEMARK OFFICE

CERTIFICATE OF CORRECTION

PATENT NO. : 3,903,371

DATED : September 2, 1975

INVENTOR(S) : John R. Colton, Robert B. Heick and Henry Mann

It is certified that error appears in the above-identified patent and that said Letters Patent are hereby corrected as shown below:

Column 8, line 19, "bvits" should read --bits--; line 49, "forming" should read --framing--. Column 10, line 30, "1—X—1—X—0—X—1—" should read -- 0—X—1—X—0—X—1— --. Column 11, line 6, "old", second occurrence, should read --odd--. Column 12, line 12, "$\hat{1}$, $\hat{2}$" should read --1, 2--; line 13, "$\hat{3}$" should read --3--, "1, 2, 3" should read --$\hat{1}$, $\hat{2}$, $\hat{3}$--. Column 15, line 17, "(IF)" should read --($\overline{IF}$)--; line 25, "degroup" should read --digroup--. Column 18, line 9, "ccount" should read --count--.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*